UNITED STATES PATENT OFFICE.

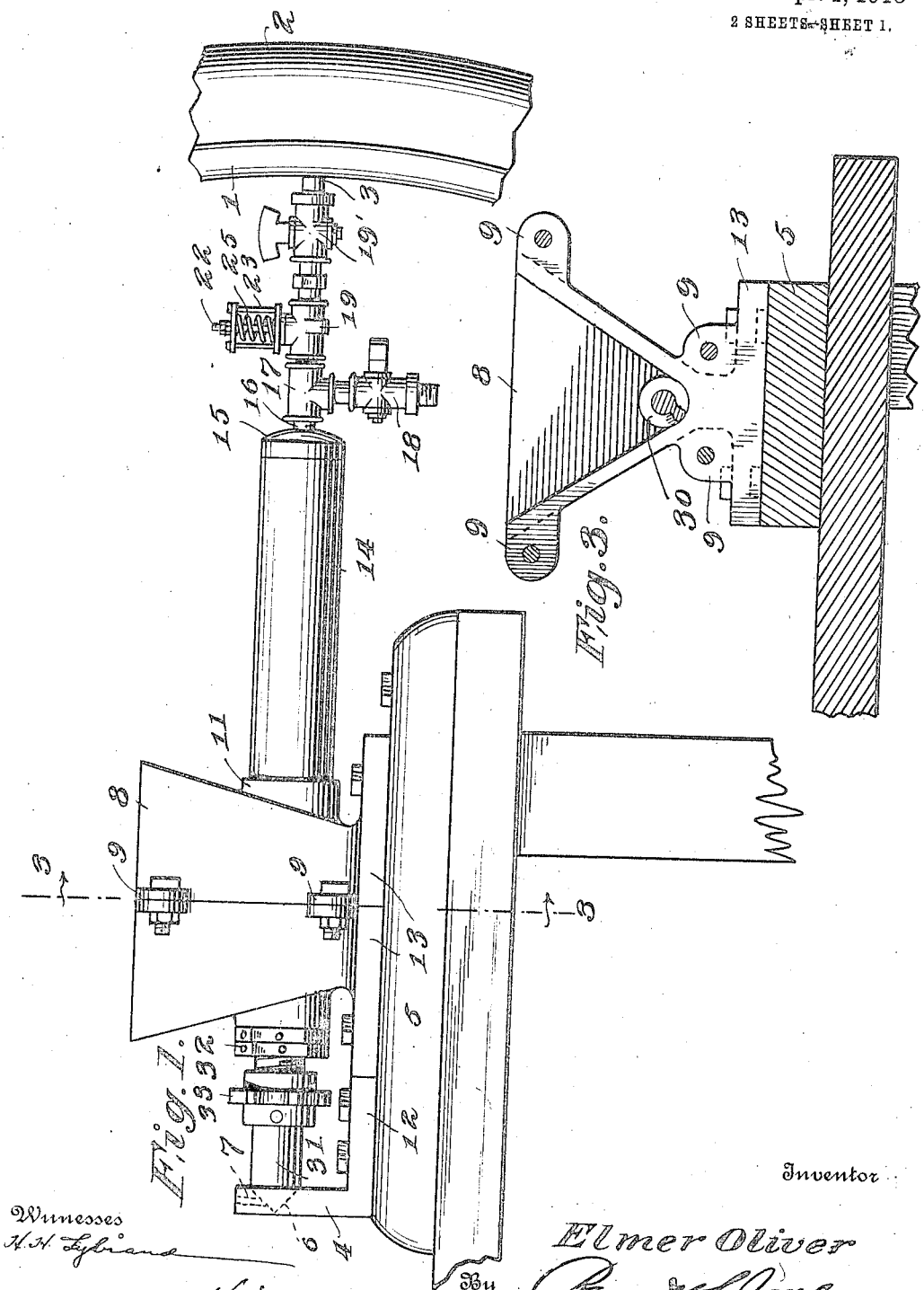

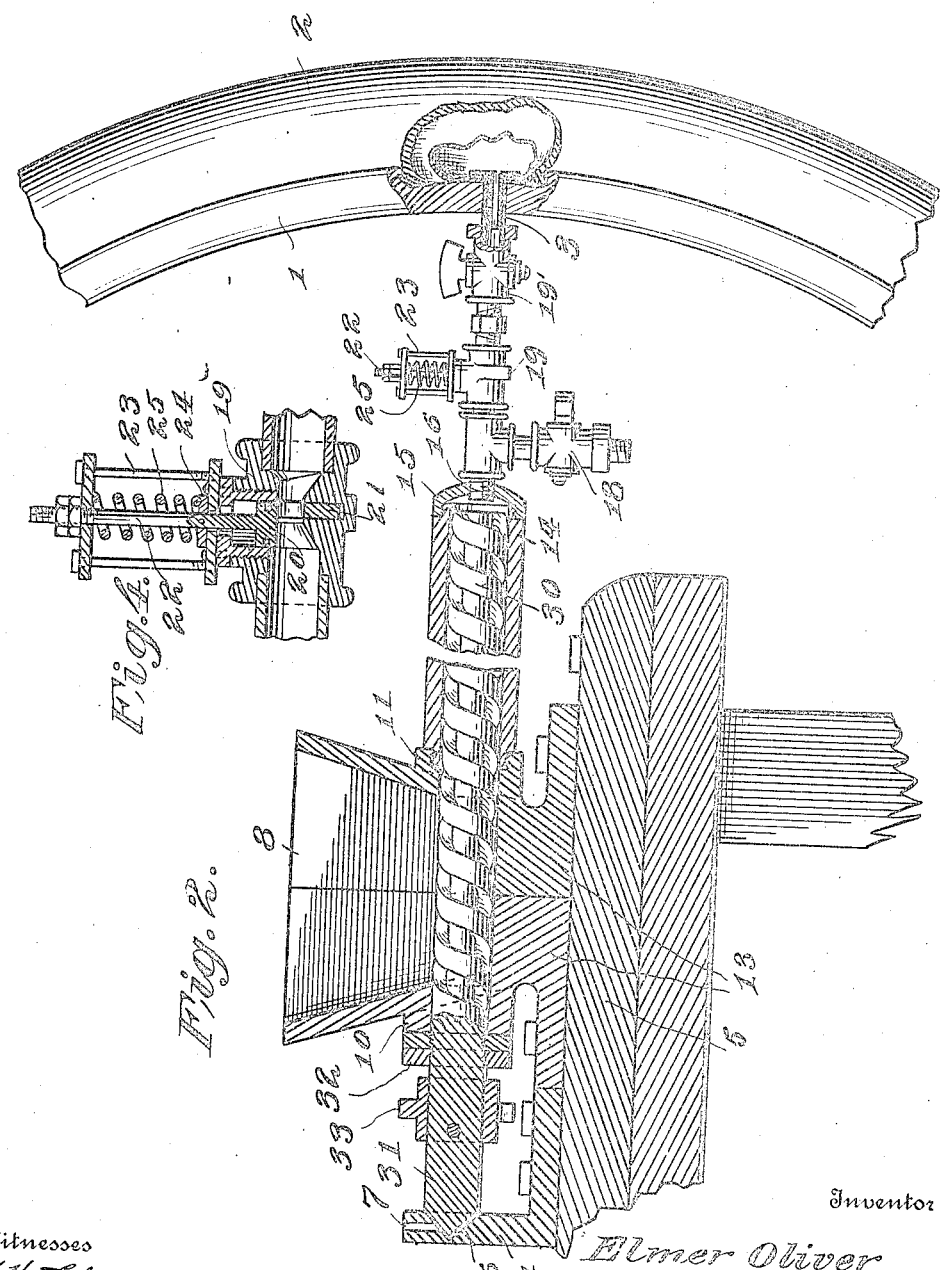

ELMER OLIVER, OF DAYTONA, FLORIDA.

TIRE-FILLING MACHINE.

1,057,451.

Specification of Letters Patent. Patented Apr. 1, 1913.

Application filed December 23, 1911. Serial No. 667,565.

*To all whom it may concern:*

Be it known that I, ELMER OLIVER, a citizen of the United States, residing at Daytona, in the county of Volusia and State of Florida, have invented certain new and useful Improvements in Tire-Filling Machines, of which the following is a specification.

My present invention pertains to tire-filling machines; and it has for its object to provide a simple, compact and efficient machine for filling tires, more particularly the tires of automobile wheels, with a hard substance.

With the foregoing in mind, the invention will be fully understood from the following description and claims when the same are read in connection with the drawings, accompanying and forming part of this specification, in which:

Figure 1 is a view illustrating my novel machine in side elevation and also showing the arrangement of the machine relative to a tire to be filled. Fig. 2 is a view, partly in vertical section and partly in elevation of the same. Fig. 3 is a view taken in the plane indicated by the line 3—3 of Fig. 1 and showing the interior of the hopper and the worm screw for feeding the hard filling substance forward from the hopper. Fig. 4 is an enlarged detail view of the pressure gage comprised in the machine.

Similar numerals of reference designate corresponding parts in all of the views of the drawings.

In Figs. 1 and 2, 1 is a wheel rim, and 2 is a tire, of rubber or other suitable resilient material; the said tire having a filling tube 3 that extends through the rim as clearly shown in Fig. 2.

My novel machine is designed to be connected to the tube 3 and to force the hard filling substance through the said tube and into the tire. Among other elements the machine comprises an upright 4 fixed on a suitable support 5 and having a socket 6 and a lubricant duct 7 leading thereto. Also fixed on the support 5 is a hopper 8 which is preferably, though not necessarily, formed in two sections; the said section being clamped together, as at 9. The bottom of the hopper describes a part of the circle, Fig. 3, and the hopper is provided at its ends with tubular projections 10 and 11. It will also be noticed here that the upright 4 has a base 12 and that the base 13 of the hopper abuts against said base 12, this with a view of lending increased stability to the hopper and strength to the machine as a whole.

Threaded into the forward tubular projection 11 of the hopper is a cylindrical and smooth-foremember 14 that is provided at its forward end with a cap 15 having a threaded nipple 16. This nipple serves for the connection of a T-coupling 17 on the depending arm of which is a relief valve or cock 18. Connected to the opposite end of the coupling 17, with reference to the nipple 16, is the casing 19 of a pressure-gage, and connected, in turn, to the said casing 19 is a cut-off valve or cock 19' designed to be connected with the filling tube 3 of the tire.

The pressure gage combines in addition to the casing 19 a piston 20 having a depending and apertured cut-off portion 21. The rod 22 of piston 20 extends upward through a frame 23 and is provided at 24 with an abutment between which and the top of the frame 23 a spring 25 is interposed. The said spring serves by exerting downward pressure on the abutment 24 to yieldingly hold the piston 20 and the apertured cut-off 21 against upward movement. When, however, the pressure in the casing becomes excessive such pressure serves to raise the piston 20 and the cut-off 21 against the action of the spring 25, whereupon the said cut-off diminishes the size of the passage through the casing 19 and consequently lessens or cuts off the supply of the hard filling substance to the tire. Attention is also directed here to the fact that when the tire is filled and a certain predetermined pressure is therein contained the cut-off 21 will close communication between the tire and the means best shown in Fig. 2 for supplying the filling substance under pressure to the tire.

When the cut-off valve partially or wholly closes, the relief valve 18 may be opened to permit of the discharge of the feeding material into a suitable receptacle, thus preventing possible damage to the apparatus before the feed screw can be stopped, and obviating the necessity of immediately throwing said screw out of action.

The means referred to comprises a worm screw 30 rotatable about its axis in the hopper bottom and the cylindrical section 14. The said worm screw is carried by shaft 31 that extends rearward through the tubular projection 10 of the hopper and has a thrust bearing in the socket 6 of the upright 4. By reason of this rearward movement of the worm screw incidental to rotation thereof is effectually prevented. It will also be noticed by reference to Figs. 1 and 2 that forward movement of the worm screw 30 during rotation thereof is effectually prevented by one or two jam nuts 32 mounted on the shaft 31 and disposed immediately in rear of the hopper projection 10, and that the said nuts may be used to adjust the worm screw as occasion demands.

The shaft 31 may be rotated by any suitable means to rotate the screw 30. I prefer, however, to effect the rotation of the said shaft through the medium of a sprocket belt (not shown) connecting a suitable source of power and a sprocket gear 33 fixed on the shaft.

In practice the machine being connected to the filling tube 3 of the tire, and the shaft 31 and the worm screw 30 being rotated, the hard filling substance is supplied to the hopper 8 whereupon such substance will be forced forward by the worm screw and into the tire. This will be continued until the filling tube is filled under the pressure desired when, as before described, the cut-off 21 of the pressure gage will isolate the tire from the filling means. The raising of the abutment 24 of the pressure gage will apprise the operator of the machine that the tire is charged to the extent desired, and the tire is then detached from the machine.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts as such changes or modifications may be made in the future practice of the invention as fairly fall within the scope of the invention as claimed.

Having described my invention, what I claim and desire to secure by Letters Patent, is:—

1. A machine for filling tires, comprising a suitably supported hopper, an upright located in rear of the same, a cylindrical section extending forwardly from the hopper, a pressure gage connected with the forward end of the cylindrical section and adapted to be connected with the tire to be filled; said gage including a spring-pressed piston and an apertured cut-off carried by said piston; a worm screw rotatable about its axis in the bottom of the hopper and the cylindrical section and a shaft fixed with respect to the worm screw and extending rearward from the hopper and having a thrust bearing against the upright located in rear of the hopper.

2. A machine for filling tires, comprising a hopper having a discharge outlet, a feed screw operating in said hopper, a feed pipe leading from the outlet, a manually operable cut off valve in said pipe, a pressure controlled valve in said pipe between the hopper and first-named cut-off valve.

3. A machine for filling tires comprising a hopper, a feed screw operating therein, a feed pipe leading from the hopper outlet and adapted for connection with a tire, and a cut off valve in said feed pipe controlled by the pressure of the material in the tire to control the feed of said material and cut off the feed thereof when the pressure in the tire reaches a predetermined degree.

4. A machine for filling tires comprising a hopper, a feed screw operating therein, a feed pipe leading from the hopper outlet and adapted for connection with a tire, a cut-off valve in said pipe and adapted to be closed by back pressure of the material when the pressure in the tire reaches a predetermined degree, and a spring opposing resistance to the closing movement of said valve.

5. A machine for filling tires comprising a hopper, a feed screw operating therein, a feed pipe leading from the outlet of the hopper and adapted for connection with a tire, a cut-off valve in said pipe adapted to be closed by back pressure of the material when the pressure in the tire reaches a predetermined degree, a spring for resisting closing movement of said valve, and means regulating the resistance of said spring.

6. A machine for filling tires comprising a hopper, a feed screw within the hopper, a feed pipe leading from the hopper outlet and adapted for connection with a tire, a manually operable cut off valve in said pipe, a relief valve in said pipe between said cut off valve and the hopper, and a pressure-controlled valve in said pipe between said manually operable cut-off valve and the said relief valve.

In testimony whereof I affix my signature in presence of two witnesses.

ELMER OLIVER.

Witnesses:
GEORGE F. CASWELL,
G. H. WILKINSON.